(12) United States Patent
Sarkar et al.

(10) Patent No.: US 7,587,570 B2
(45) Date of Patent: Sep. 8, 2009

(54) SYSTEM AND METHOD FOR PROVIDING AUTOMATED STORAGE PROVISIONING

(75) Inventors: Prasenjit Sarkar, San Jose, CA (US); Gauri Sudhir Shah, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 230 days.

(21) Appl. No.: 11/421,071

(22) Filed: May 31, 2006

(65) Prior Publication Data

US 2007/0283119 A1 Dec. 6, 2007

(51) Int. Cl.
*G06F 12/08* (2006.01)
(52) U.S. Cl. .................................... 711/170
(58) Field of Classification Search ................ 711/170
See application file for complete search history.

(56) References Cited

U.S. PATENT DOCUMENTS

| | | | |
|---|---|---|---|
| 5,649,196 A * | 7/1997 | Woodhill et al. ............. 707/204 |
| 5,758,347 A | 5/1998 | Lo et al. |
| 5,873,097 A | 2/1999 | Harris et al. |
| 6,016,495 A * | 1/2000 | McKeehan et al. ...... 707/103 R |
| 6,449,627 B1 | 9/2002 | Baer et al. |
| 6,510,491 B1 * | 1/2003 | Franklin et al. ............. 711/114 |
| 7,143,235 B1 * | 11/2006 | Watanabe et al. ........... 711/114 |
| 7,424,637 B1 * | 9/2008 | Schoenthal et al. ............ 714/6 |
| 2002/0019908 A1 * | 2/2002 | Reuter et al. ................ 711/112 |
| 2003/0126240 A1 * | 7/2003 | Vosseler ...................... 709/221 |
| 2003/0225801 A1 * | 12/2003 | Devarakonda et al. ...... 707/205 |
| 2004/0018844 A1 * | 1/2004 | Cheng ..................... 455/456.1 |
| 2005/0027725 A1 * | 2/2005 | Kagalwala et al. .......... 707/100 |
| 2005/0055529 A1 * | 3/2005 | Lubbers et al. ............. 711/203 |
| 2005/0117562 A1 * | 6/2005 | Wrenn ....................... 370/351 |
| 2005/0120359 A1 * | 6/2005 | Shoji et al. .................. 719/321 |
| 2005/0246503 A1 * | 11/2005 | Fair ........................... 711/147 |
| 2005/0262097 A1 * | 11/2005 | Sim-Tang et al. ............. 707/10 |
| 2006/0075007 A1 * | 4/2006 | Anderson et al. ........... 707/206 |
| 2006/0085593 A1 * | 4/2006 | Lubbers et al. ............. 711/114 |
| 2006/0126636 A1 * | 6/2006 | Dooley et al. ............ 370/395.3 |
| 2006/0184731 A1 * | 8/2006 | Corbett et al. .............. 711/114 |

(Continued)

OTHER PUBLICATIONS

J. Rosenberg et al., "Operating System Support for Persistent and Recoverable Computations," Communications of the ACM, vol. 39, No. 9, Sep. 1996, pp. 62-69.

(Continued)

*Primary Examiner*—Matt Kim
*Assistant Examiner*—Hal Schnee
(74) *Attorney, Agent, or Firm*—Shimokaji & Associates, P.C.; Samuel A. Kassatly

(57) ABSTRACT

A storage provisioning system generates a storage management framework comprising a resource model representing a set of storage devices for use by an application. The resource model comprises a set of data containers and at least one volume container such that the resource model provides storage to the application independent of a plurality of interfaces used by the set of storage devices. The volume container is a specialized data container that interfaces directly with the storage devices and represents a bottom of a storage stack comprising at least one data container and at least one volume container. The resource model comprises a rules module for governing the construction of the data containers and the volume container and association between the data containers and the volume container.

18 Claims, 10 Drawing Sheets

U.S. PATENT DOCUMENTS

| | | | |
|---|---|---|---|
| 2006/0184821 A1* | 8/2006 | Hitz et al. ...................... | 714/6 |
| 2006/0259727 A1* | 11/2006 | Thomas et al. ............... | 711/165 |
| 2006/0277361 A1* | 12/2006 | Sharma et al. ............... | 711/114 |
| 2007/0050538 A1* | 3/2007 | Northcutt et al. ............ | 711/112 |
| 2007/0136548 A1* | 6/2007 | Mane ........................... | 711/170 |
| 2007/0162359 A1* | 7/2007 | Gokhale et al. ............... | 705/28 |
| 2007/0220199 A1* | 9/2007 | Moore et al. ................. | 711/112 |
| 2007/0250551 A1* | 10/2007 | Lango et al. ................. | 707/205 |
| 2007/0255921 A1* | 11/2007 | Gole et al. .................... | 711/170 |
| 2007/0283088 A1* | 12/2007 | Hannigan .................... | 711/114 |

OTHER PUBLICATIONS

Alvarez, GA. et al., "Minverva: An Automated Resource Provisioning Tool for Large-Scale Storage Systems," ACM Transactionson Computer Systems, vol. 19, No. 4, Nov. 2001, pp. 483-518.

Sivathanu, M. et al., "Improving Storage System Availability With D-GRAID," ACM Transactionson Storage, vol. 1, No. 2, May 2005, pp. 133-170.

Grimm, R. et al., "System Support for Pervasive Applications," ACM Transactions on Computer Systems, vol. 22, No. 4, Nov. 2004, pp. 421-486.

Lugwig, H. et al., "Cremona: An Architecture and Library for Creation and Monitor of WS-Agreements," ICSOC'04, pp. 65-74, Nov. 15-19, 2004.

Jin, W. et al., "Interposed Proportional Sharing for a Storage Service Facility," Sigmetrics/Performance'04, pp. 37-48, Jun. 12-16, 2004.

* cited by examiner

SYSTEM AND METHOD FOR PROVIDING AUTOMATED STORAGE PROVISIONING

FIELD OF THE INVENTION

The present invention generally relates to storage provisioning of complex storage environments, and in particular to storage provisioning using virtual data containers and volume containers as an abstract interface for storage devices from varied vendors.

BACKGROUND OF THE INVENTION

Conventional storage environments typically comprise storage resources from many different vendors. The storage resources may be procured from different vendors to provide a specific type of storage within the storage environment such as, for example, high reliability storage, fast access storage, minimum cost storage, etc. Each vendor provides a proprietary interface and management software for each type of storage device. Consequently, storage provisioning for these conventional storage environments is difficult. The task of storage provisioning in such a complex storage environment is made more difficult by the many layers of storage virtualization typically used in complex storage environments.

Conventional storage provisioning is performed manually, involving a large number of people, processes, and policies. Conventional storage provisioning is time-consuming, expensive, and error-prone. Alternatively, conventional storage provisioning is performed by developing customized workflows in specific user environments; these workflows cannot be easily used in or ported to other environments.

Automated storage provisioning in conventional storage environments is a difficult task due to a lack of integrated storage management across different storage entities and different storage vendors, a lack of standard non-proprietary interfaces to manage storage resources provided by different storage vendors, and a lack of automatic translation of high-level application requirements into low-level resource capabilities.

What is needed to provide a uniform solution to the problem of storage management is a common data model to represent all the layers of storage virtualization in a uniform manner, standard services associated with the entities in the data model that can easily enable storage management services, and a policy framework that allows mapping high-level application requirements to low-level storage plans and resource capabilities.

Thus, there is a need for a system, a computer program product, and an associated method for providing automated storage provisioning in complex data center environments. The need for such a solution has heretofore remained unsatisfied.

SUMMARY OF THE INVENTION

The present invention satisfies this need, and presents a system, a computer program product, and an associated method (collectively referred to herein as "the system" or "the present system") for providing automated storage provisioning. The present system generates a storage management framework comprising a resource model representing a set of storage devices for use by an application or user. The resource model comprises a set of data containers and at least one volume container such that the resource model provides storage to the application independent of a plurality of interfaces used by the set of storage devices.

The volume container is a specialized data container that interfaces directly with the storage devices and represents a bottom of a storage stack comprising at least one data container and at least one volume container. A volume container represents a relation between a set of storage devices and a set of hosts that run the applications which access these storage devices. It can provide storage to one or more data containers or applications, and receive storage from zero or more data containers. The resource model comprises a rules module for governing the construction of the data containers and the volume container and association between the data containers and the volume container.

The storage management framework comprises a data container services module comprising a set of standard services that can be performed on the data containers. The storage management framework further comprises a volume container services module comprising a set of standard services that can be performed on the volume container. The storage management framework comprises at least one of a management agent that monitors the physical resources and invokes the standard services based on the state of the entities relative to the policies associated with the entities. The storage management framework comprises a set of policies associated with specific data containers and volume containers and wherein the set of policies define management of the data containers and the volume containers. Each of the data containers receives storage from at least one data container and provides storage to at least one data container or application.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF PREFERRED EMBODIMENTS

Figure 1:
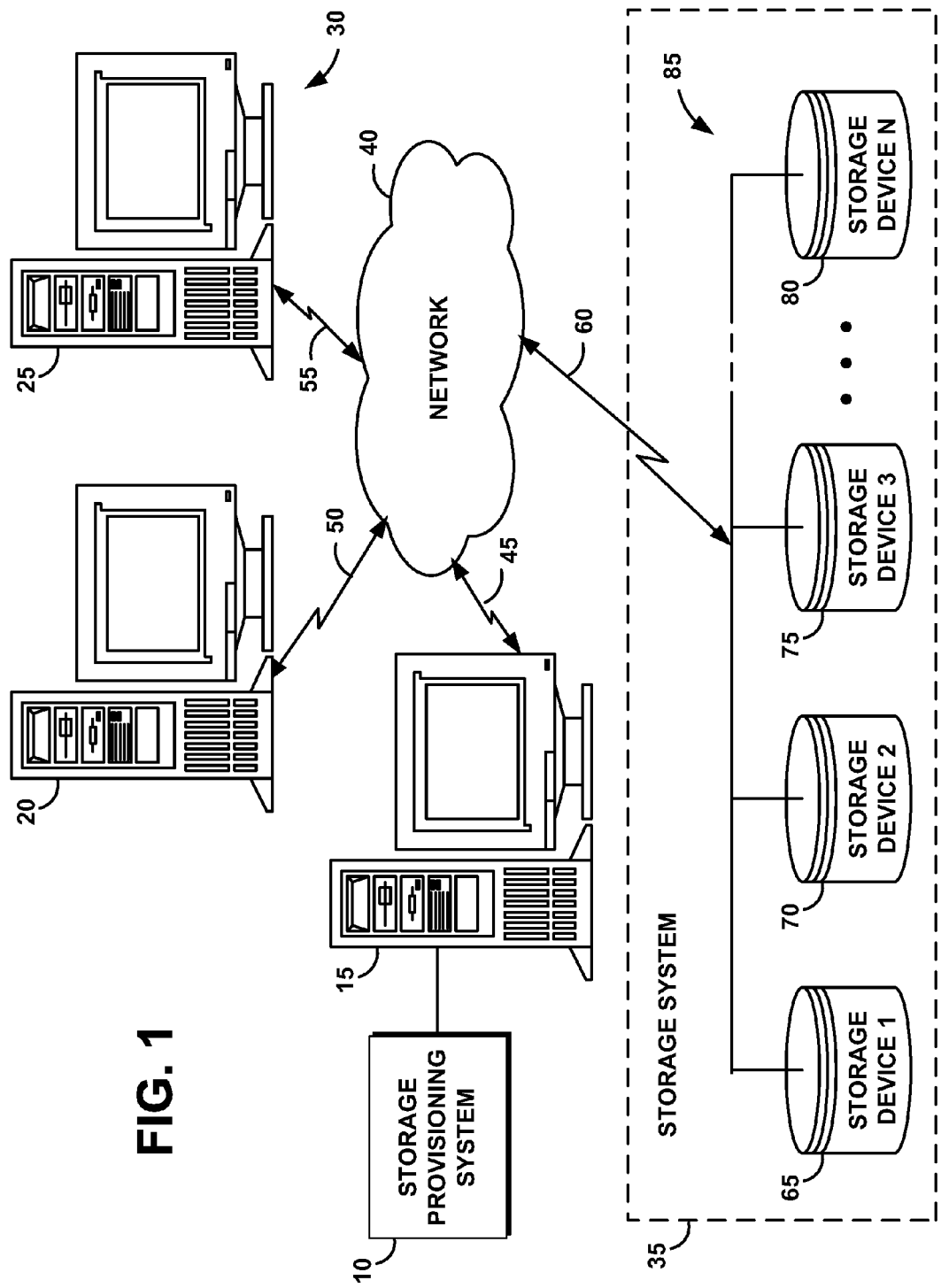
FIG. 1 is a schematic illustration of an exemplary operating environment in which a storage provisioning system of the present invention can be used.

FIG. 1 portrays an exemplary overall environment in which a system, a computer program product, and an associated method (the storage provisioning system 10 or the "system 10") for providing automated storage provisioning according to the present invention may be used. System 10 comprises a software programming code or a computer program product that is typically embedded within, or installed on a server 15. Alternatively, system 10 could run on a machine to provide automated storage provisioning and could be saved, at least in part, on a suitable storage medium such as a diskette, a CD, a hard drive, or like devices.

The present system may be embodied in a utility program such as a storage provisioning utility program. The present system provides a method for the user to generate a storage stack comprising one or more data containers and a volume container by specifying a environment in which the storage stack is located, and then invoking the storage provisioning utility to generate the storage stack. The environment specified by the user comprises top-level applications that use the storage in the system, a list of servers of which these applications run, a list of policies associated with each application that dictate the quality of storage provided to that application, and a mechanism to discover and query the underlying storage devices to create and manage the container data model.

System 10 can take the form of an entirely hardware embodiment, an entirely software embodiment or an embodiment containing both hardware and software elements. In one embodiment, system 10 is implemented in software, which includes but is not limited to firmware, resident software, microcode, etc.

Furthermore, system 10 can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (apparatus or device) or a propagation medium. Examples of a computer-readable medium include a semiconductor or solid-state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

A data processing system suitable for storing or executing program code includes at least one processor coupled directly or indirectly to memory elements through a system bus. The memory elements can include local memory employed during actual execution of the program code, bulk storage, and cache memories that provide temporary storage of at least some program code to reduce the number of times code is retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

Users, such as remote Internet users, are represented by a variety of computers such as computers 20, 25 (collectively referenced as users 30 or applications 30). Computers 20, 25 can access server 15 and a storage system 35 through a network 40. Computers 20, 25, may also represent applications that access and utilize the storage system 35. Computers 20, 25 each comprise software that allows the user or application to interface securely with server 15. Server 15 is connected to network 40 via a communications link 45 such as a telephone, cable, or satellite link. Computers 20, 25, can be connected to network 40 via communications links 50, 55 respectively. The storage system 35 can be connected to network 40 via a communications link 60. While system 10 is described in terms of network 40, computers 20, 25 may also access system 10, the storage system 35, or the server 15 locally rather than remotely. Computers 20, 25 may access system 10 either manually, or automatically through the use of an application.

The storage system 35 comprises one or more storage devices such as storage device 1, 65, storage device 2, 70, storage device 3, 75, through storage device N, 80 (collectively referenced as storage devices 85). Each of the storage devices 85 may be provided by any of a variety of vendors with any of a variety of interfaces and storage management software.

Figure 2:
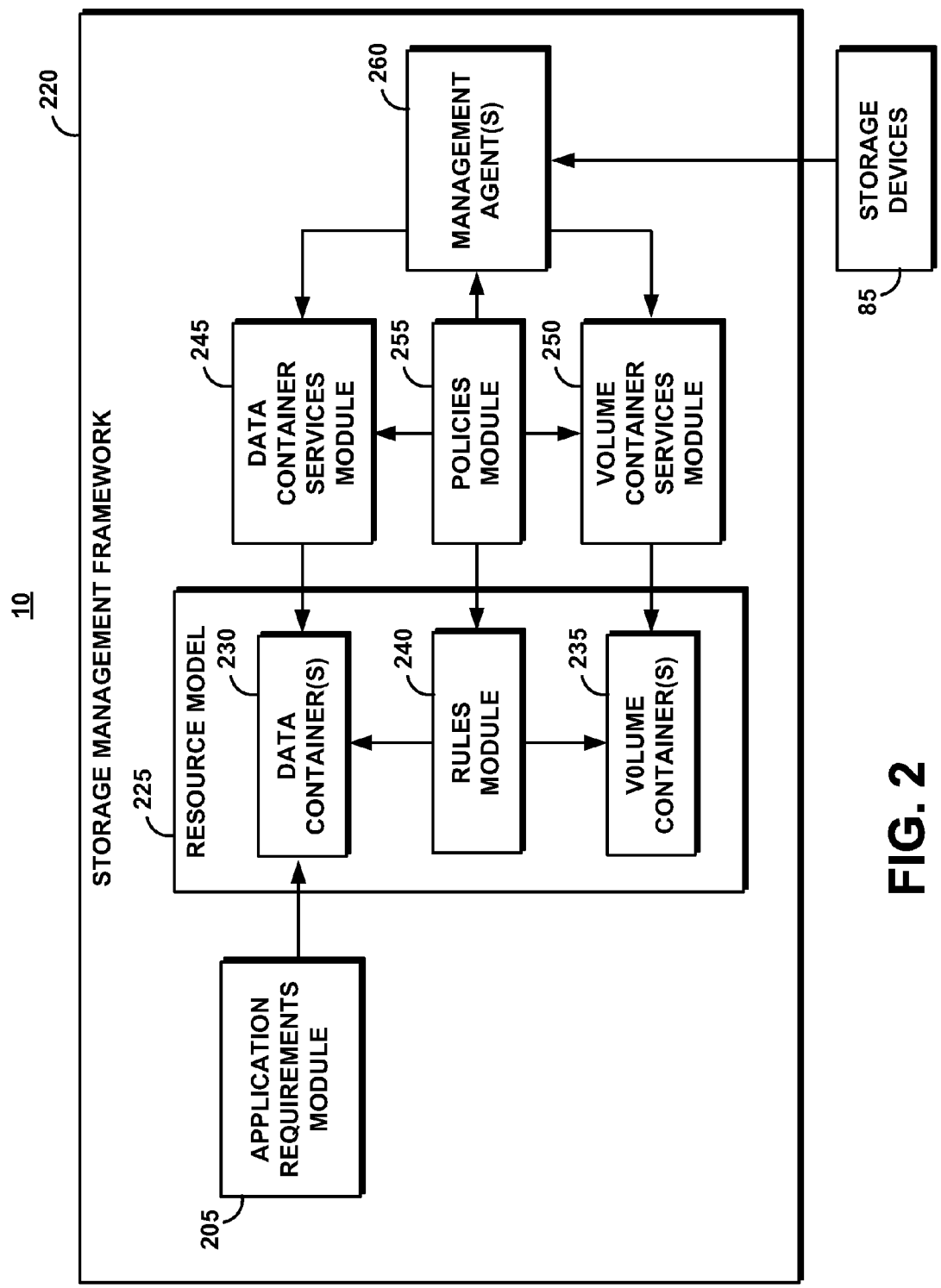
FIG. 2 is a block diagram of the high-level architecture of the storage provisioning system of FIG. 1.

FIG. 2 illustrates a high-level hierarchy of system 10. System 10 provides a uniform model of a storage stack. The storage stack provides storage to an application that requires a certain quality of storage from the storage devices 85. The data model represents the different layers of available storage virtualization with provisions to support further extensions. System 10 provides a framework to define storage management services with the data model, thus automating the process of performing storage management services with a universal interface to the storage devices 85. System 10 further provides a framework to define policies to map application requirements at the top of the storage stack in the data model to the resources at the bottom of the storage stack.

System 10 comprises storage management framework 220. The storage management framework 220 comprises an applications requirements module 205 which in turn comprises application requirements such as performance, availability, etc.

The storage management framework 220 also comprises a resource model 225. The resource model 225 comprises one or more data containers 230, one or more volume containers 235, and a rules module 240. A storage stack generated by system 10 comprises one or more data containers 230 and one or more volume containers 235. The rules module 240 comprises rules governing the construction of data containers 230 and volume containers 235. The rules module 240 further comprises rules for association of data containers 230 and volume containers 235 within the resource model 225.

The storage management framework 220 further comprises a data container services module 245, a volume container services module 250, a policies module 255, and one or more management agent(s) 260. The data container services module 245 comprises a set of standard services that can be performed on the data containers 230, where the services for a specific resource in the storage devices 85 may be provided by any vendor (or proxy for the vendor) providing the specific physical or logical storage resource. The volume container services module 250 comprises a set of standard services that can be performed on volume containers 235, where the services for a specific resource in the storage devices 85 may be provided by any vendor (or proxy for the vendor) providing the specific physical or logical storage resource.

The policies module 255 comprises policies associated with specific data containers 230 or volume containers 235. The policies define management of data containers 230 and volume containers 235 by system 10. Policies for the data containers 230 dictate the high-level properties of associated data containers 230. Policies for the volume containers 235 dictate the types of volumes that comprise each of the volume containers 235. The policies module 255 further comprises a zoning policy; the zoning policy dictates zoning constraints for applications 30 and storage devices 85 associated each of the volume containers 235. The management agents 260 monitor the storage devices 85 and invoke standard services in the data container services module 245 and the volume container services module 250 based on a state of the storage devices 85 relative to the policies associated with the storage devices 85.

The resource model 225 models storage devices 85. The resource model 225 further models the storage stack from applications 30 to the lowest level storage subsystem unit in the storage devices 85.

The data containers 230 represent a container that provides storage. Each of the data containers can in turn receive storage from some other data container 230. There is a many-to-many relation between data containers 230, further referenced herein as a "getsStorageFrom" relation. Due to the many-to-many relation between data containers, the "getsStorageFrom" relation is a recursive relation. Exemplary data containers 230 comprise a file system data container (further referenced herein as a file system container) that represents a file system, a database data container (further referenced herein as a database container) that represents a database, a tablespace data container (further referenced herein as a tablespace container) that represents a tablespace, a logical volume data container (further referenced herein as a logical volume container) that represents a logical volume, and a volume group data container (further referenced herein as a volume group container) that represents a volume group.

The volume container 235 comprises a specialized type of data container 230 used to represent the bottom of a storage virtualization stack or storage stack. The storage stack comprises data containers 230 and one of the volume containers 235. The volume container 235 represents the termination of the recursive "getsStorageFrom" relation. The volume container 235 models a relation between the storage devices 85 and hosts running applications 30 that use the storage devices 85. Each of the storage devices 85 can belong to only one volume container 235 but each of the hosts running applications 30 can be a part of one or more of the volume containers 235.

System 10 simplifies storage management by hiding the device level details of the storage devices 85, allowing administrators and software using any storage management software of the individual storage services 85 to view storage as simply a container for data. System 10 encapsulates all of the storage networking details within the abstraction of the data containers 230 and the volume containers 235.

Additional entities in the resource model 225 of system 10 comprise a data path, a storage pool, a storage pool collection, port, a host bus adapter (HBA) for a server in the applications 30, a switch, and a node. The data path represents a pair of connected ports, one host (initiator) port and one storage device (target) port. The storage pool represents a storage pool in the storage devices 85. The storage pool collections represent a collection of storage pools that have similar properties. The port is a port on a switch, on a host in the applications 30, or on a storage subsystem in the storage devices 85. The switch represents a fiber-channel switch. The node represents the fiber channel nodes provided by the storage devices 85.

Each of the data containers 230 comprises the following common attributes: a unique identifier, one or more services, a policy, and one or more data containers. Each data container 230 is associated with a unique identifier that is generated when the data container 230 is created. In one embodiment, the unique identifier for the data container 230 is the name of the data container 230.

Each data container 230 has one or more associated services. These services represent different operations that can be performed on the data container 230. Each data container 230 supports one or more basic services. Additional services may be registered if the additional services are required and available to create specialized data containers 230. A service can be invoked on one of the data containers 230 by making a function call that takes in as input the required parameters of the service. Each data container 230 can have additional associated services. Furthermore, each service can be registered with one or more of the data containers 230. Consequently, there is a many-to-many relation between the data containers 230 and services.

A policy is defined with each data container 230; the policy dictates management of the data container 230, and the quality of storage provided to the data container 230. The policy for a specified data container 230 may be applicable to different layers of data containers 230 below the specified data container 230 as well. System 10 requires the policies at all levels below each of the data containers 230 to be non-conflicting or to have well-defined priorities for pre-emption. A policy can be associated with one or more data containers 230. However, each of the data containers 230 has a single policy. Consequently, there is a many-to-one relation between data containers 230 and policies.

The data container 230 obtains storage from another of the data containers 230 or the volume container 235. Each data container 230 can obtain storage from one or more of the data containers 230. The data container 230 can provide storage to one or of the more data containers 230.

A database container comprises the following attributes: name, owner, block size, log mode, status, read-write, read-only, etc., maximum instances, number of tablespaces, maximum data files, number of data files, maximum log files, number of log files, total size, free space, create time, delete time, log size, log free space, type, and server. The block size is the size of one database block. The log mode indicates whether the database is in archive log mode. For example, with the database management system Oracle, the (redo) log file may get lost if it gets written over, and if it is not archived. Archiving the log file ensures that the database can be restored up to the last transaction using the archived log file. Status indicates a current status of the database, e.g., if the database is mounted. Sever indicates the server on which the database is running.

A tablespace container comprises the following attributes: name, number of data files, status, number of tables, number of indices, minimum extent size, initial extent size, next extent size, minimum number of extents, maximum number of extents, logging, total size, free space, number of coalesced extents, minimum free extent, maximum free extent, create time, and delete time.

A file system container comprises the following attributes: mount point, maximum number of files, physical size, capacity, used space, free space, number of files, number of directories, type, use count, and export name. Use count indicates the number of computers that have direct access to the file system represented by the file system container.

A file container comprises the following attributes: name, maximum size, type, total size, free space, create time, and delete time.

A logical volume container comprises the following attributes: name, type, size, used for swap, and use count.

A volume group container comprises the following attributes: name, free space, capacity, type, and number of volumes.

The volume containers 235 do not have any attributes of their own. Each of the volume containers 235 has an associated policy or it inherits a policy attribute from the definition of associated data containers 230. The volume container 235 represents a relation between a group of servers (applications 30) and the storage devices 85. This is a many-to-many relation that cannot be represented as an attribute of the volume container 235. The relation between hosts and a volume container, and storage volumes and a volume container is represented using appropriate associations in the resource model 225.

To generate a storage stack comprising one or more data containers 230 and a volume container 235, system 10 performs a recursion through the different types of data containers 230 until system 10 reaches a volume container 235 that comprises storage devices 85 that can be provisioned. The top-level data containers 230 such as a file system container, a database container, and a tablespace container represent applications that depend on a storage management solution for configuration. Each data container 230 obtains storage from a lower-level data container 230. System 10 uses the "getsStorageFrom" attribute of the data container 230 to represent this dependency relationship.

Figure 3:
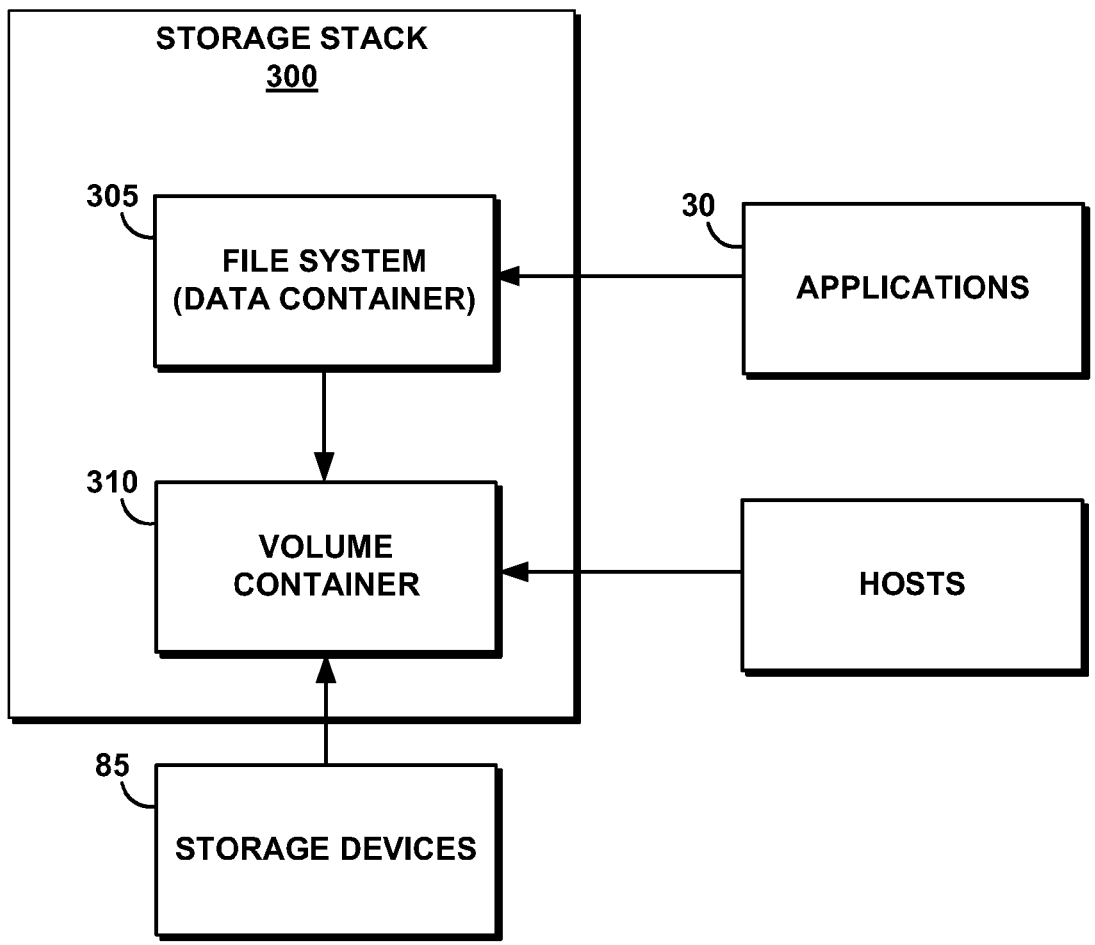
FIG. 3 is a diagram illustrating an exemplary model generated by the storage provisioning system of FIGS. 1 and 2 for a local file system in which the local file system obtains storage from a storage device.

FIG. 3 illustrates an exemplary model of a storage stack 300 generated by system 10 of a local file system in which the file system obtains storage directly from the storage devices 85. The file system is represented as a file system container 305 that obtains storage from another specialized data container 230, i.e., a volume container 310. The volume container 310 represents the collection of storage devices 85 that provide storage to the local file system and the servers or applications 30 associated with the file system.

Figure 4:
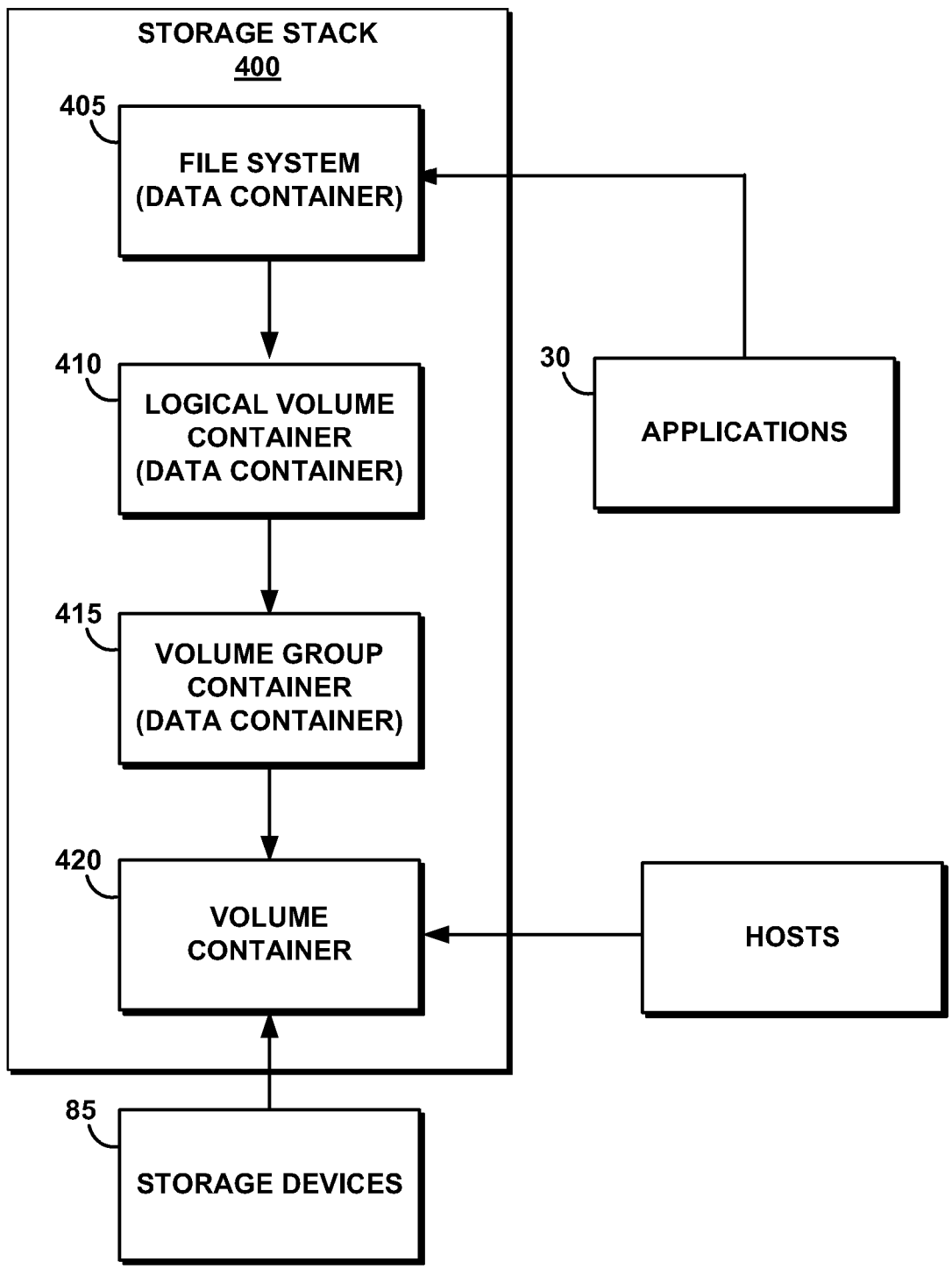
FIG. 4 is a diagram illustrating an exemplary model generated by the storage provisioning system of FIGS. 1 and 2 for a local file system in which the local file system obtains storage from a logical volume.

FIG. 4 illustrates an exemplary model of a storage stack 400 generated by system 10 of a local file system in which the file system obtains storage from a logical volume. The file system is represented as a file system container 405, a data container 230 that obtains storage from another specialized data container 230, i.e., a logical volume container 410. The recursive chain of "getsStorageFrom" is then continued as follows: the logical volume container 410 obtains storage from volumes in a volume group container 415. The volume group container 415 obtains storage from a volume container 420 that represents a relation between the storage devices 85 that comprise the volume group and the hosts or applications 30 that are associated with the logical volume and the volume group.

Figure 5:
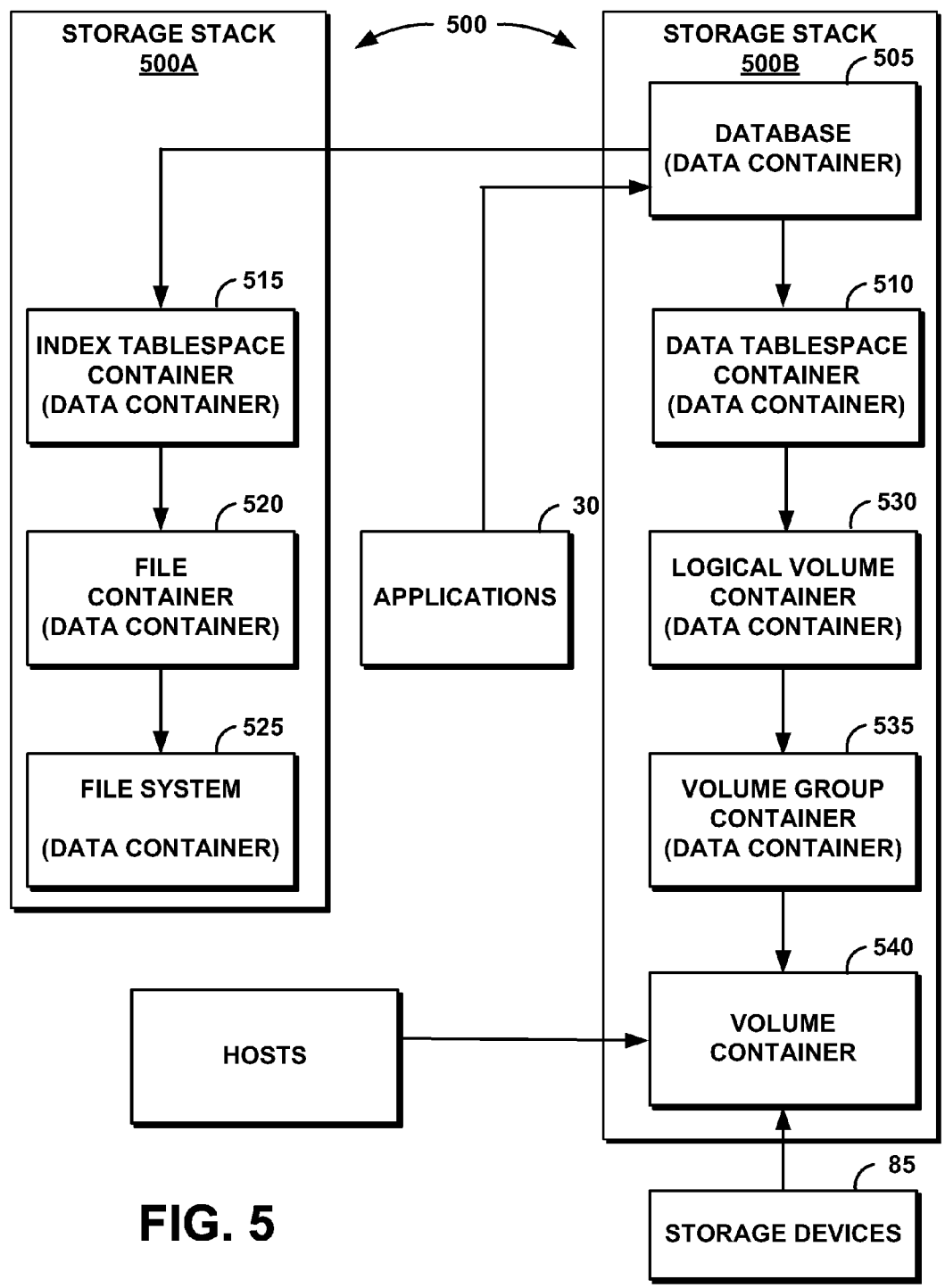
FIG. 5 is a diagram illustrating an exemplary model generated by the storage provisioning system of FIGS. 1 and 2 for a database management system.

FIG. 5 illustrates an exemplary model of a storage stack 500 comprising a storage stack 500A and a storage stack 500B generated by system 10 of a database management system. In a database management system, the top-level database object is represented as a database container 505. The database container 505 comprises data containers that represent the tablespaces of the database: a data tablespace container 510 and an index tablespace container 515. Each tablespace in the database management system can obtain storage from different sources.

For example, the index tablespace container 515 can obtain storage from a file container 520. The file container 520 obtains storage from a file system container 525. A storage stack below the file system container 525 can, for example, obtain storage directly from some storage devices 85 or obtain storage from a logical volume container as described in FIG. 3 and FIG. 4.

The data tablespace container 510 can obtain storage from a logical volume container 530 in a manner similar to that described in FIG. 3 and FIG. 4. The logical volume container 530 obtains storage from a volume group container 535. The volume group container 535 obtains storage from a volume container 540. The volume container 540 associates the storage devices 85 that provide the storage for the database management system and the hosts or applications 30.

Figure 6:
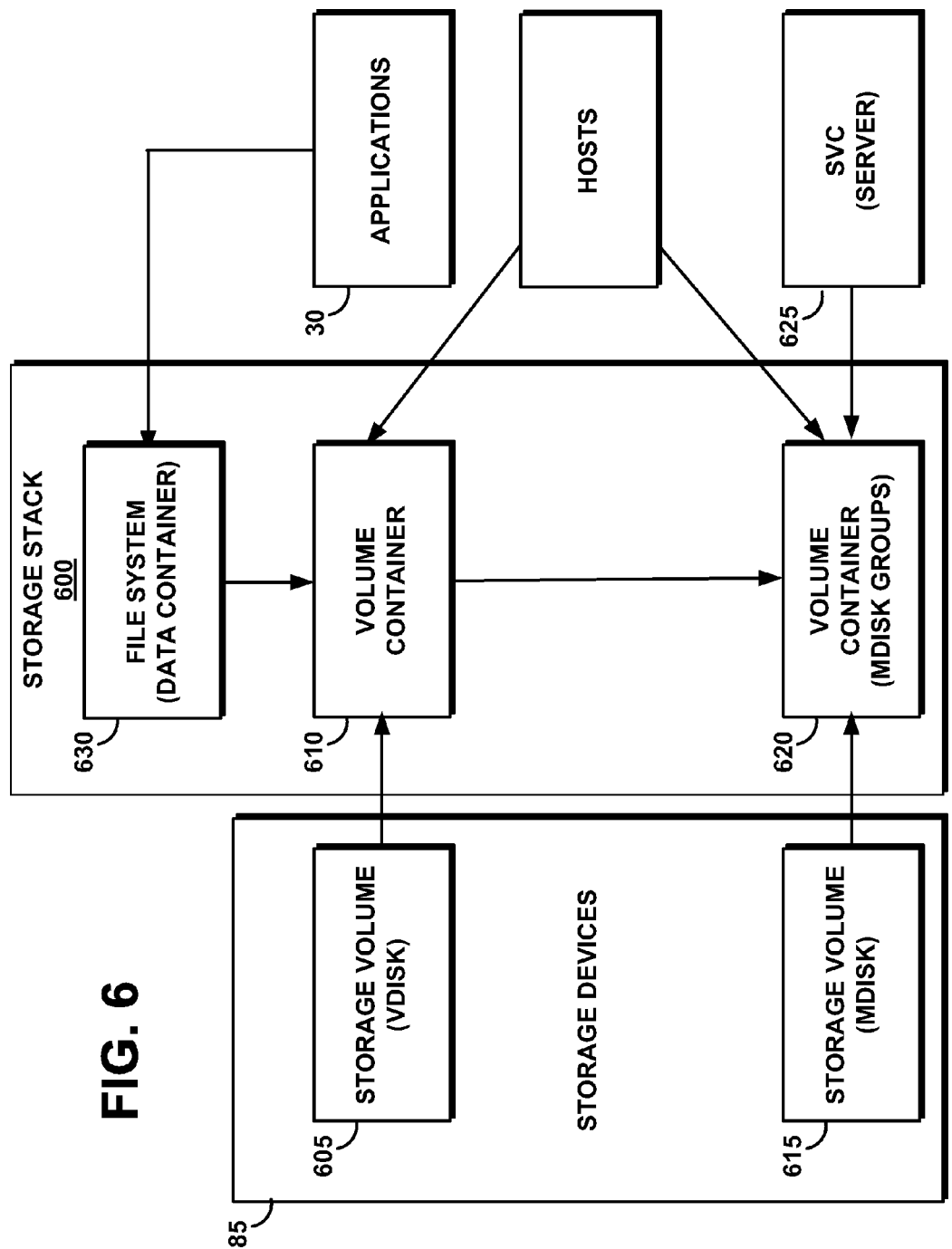
FIG. 6 is a diagram illustrating an exemplary model generated by the storage provisioning system of FIGS. 1 and 2 for an in-band virtualization system, such as Storage Volume Controller (SVC)

FIG. 6 illustrates an exemplary model of a storage stack 600 generated by system 10 of an in-band virtualization system, or a Storage Volume Controller (SVC) system. In the case of SVC, system 10 maps virtual disks represented by storage volume (vdisk) 605 to volume container 610. System 10 maps managed disks (mdisk) represented by storage volume (mdisk) 615 to volume container (mdisk group) 620. Managed disk groups are represented as volume containers 235 that group together managed disks; these managed disks are mapped to storage devices 85 and an SVC server 625.

System 10 further maps a group of virtual disks to a volume container that can provide storage to the entity above the SVC virtualization box 625, for example a file system container 630. The volume container 610 that groups a set of vdisks (represented by storage volume (vdisk) 605) also maintains associations with the hosts or applications 30 that use the top-level data container (the file system container 630) that obtains storage from the volume container 620.

Figure 7:
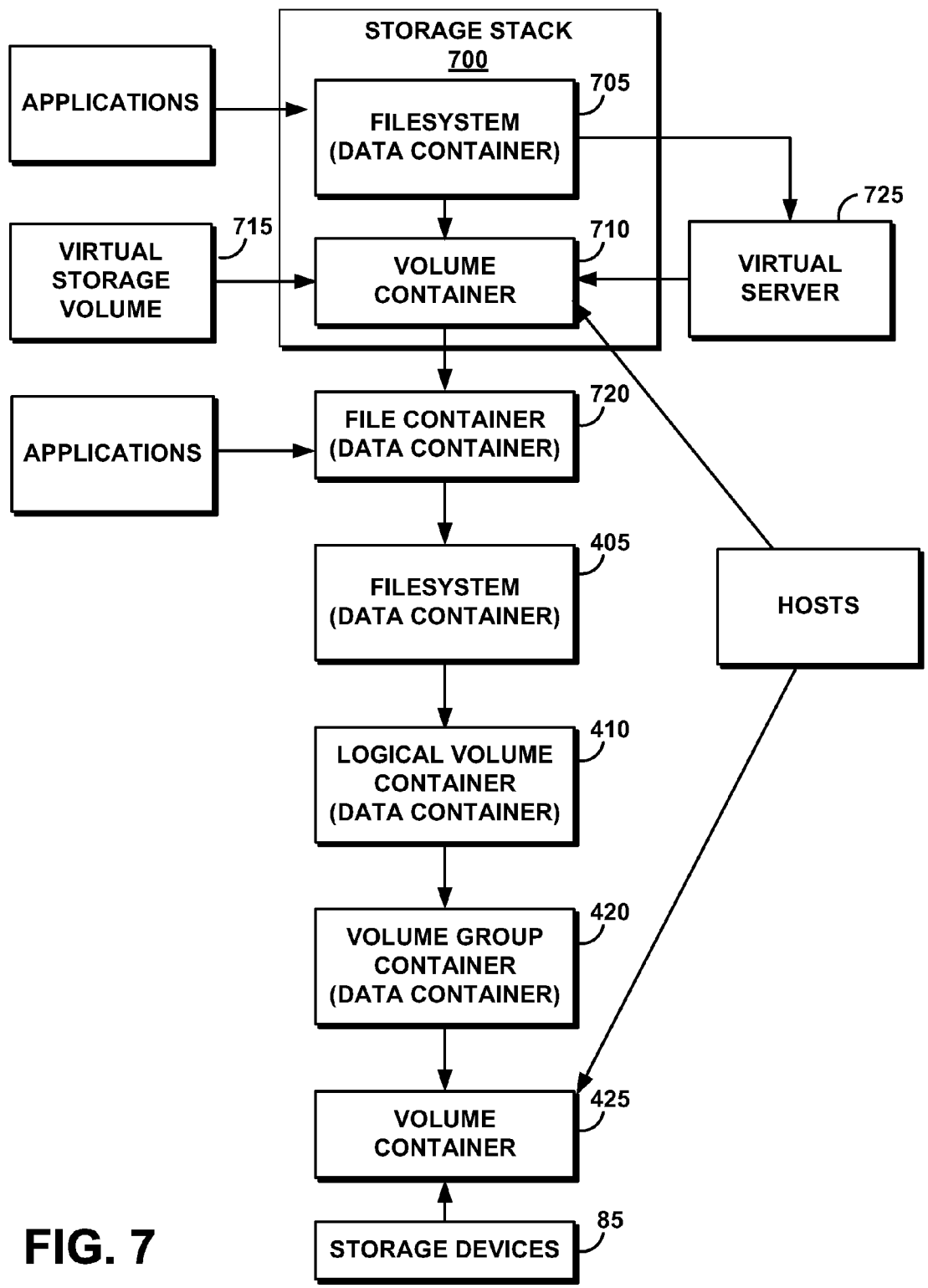
FIG. 7 is a diagram illustrating an exemplary model generated by the storage provisioning system of FIGS. 1 and 2 for VMWare. VMWare is a registered trademark of VMware Corporation. Palo Alto, Calif.

FIG. 7 illustrates an exemplary model of storage stack 700 generated by system 10 for a virtual machine such as VMWare. VMWare is a registered trademark of VMware Corporation. Palo Alto, Calif. In case of VMWare, a file system container 705 (or any other top-level data container) obtains storage from a group of raw storage devices that are grouped together in a volume container 710. However, these storage devices are virtual (represented by a virtual storage volume 715), and the volume container 710 actually obtains storage from a file in another file system. This file maps to a data container (a file container 720) and provides storage to the volume container 710 that in turn provides storage for the top-level local file system via the file system container 705. The virtual server 725 allows different operating system images to be loaded on the same physical server to simulate the operation of multiple servers virtually without requiring multiple physical servers.

A second file system that provides storage can follow the same storage stack as described previously for FIG. 4. As illustrated in FIG. 7, the file system container 405 follows a storage stack down via the logical volume container 410, the volume group container 420, the volume container 425, and storage devices 85. Alternatively, the file system container 405 can directly get its storage from storage devices 85 that are grouped together in a volume container.

Figure 8:
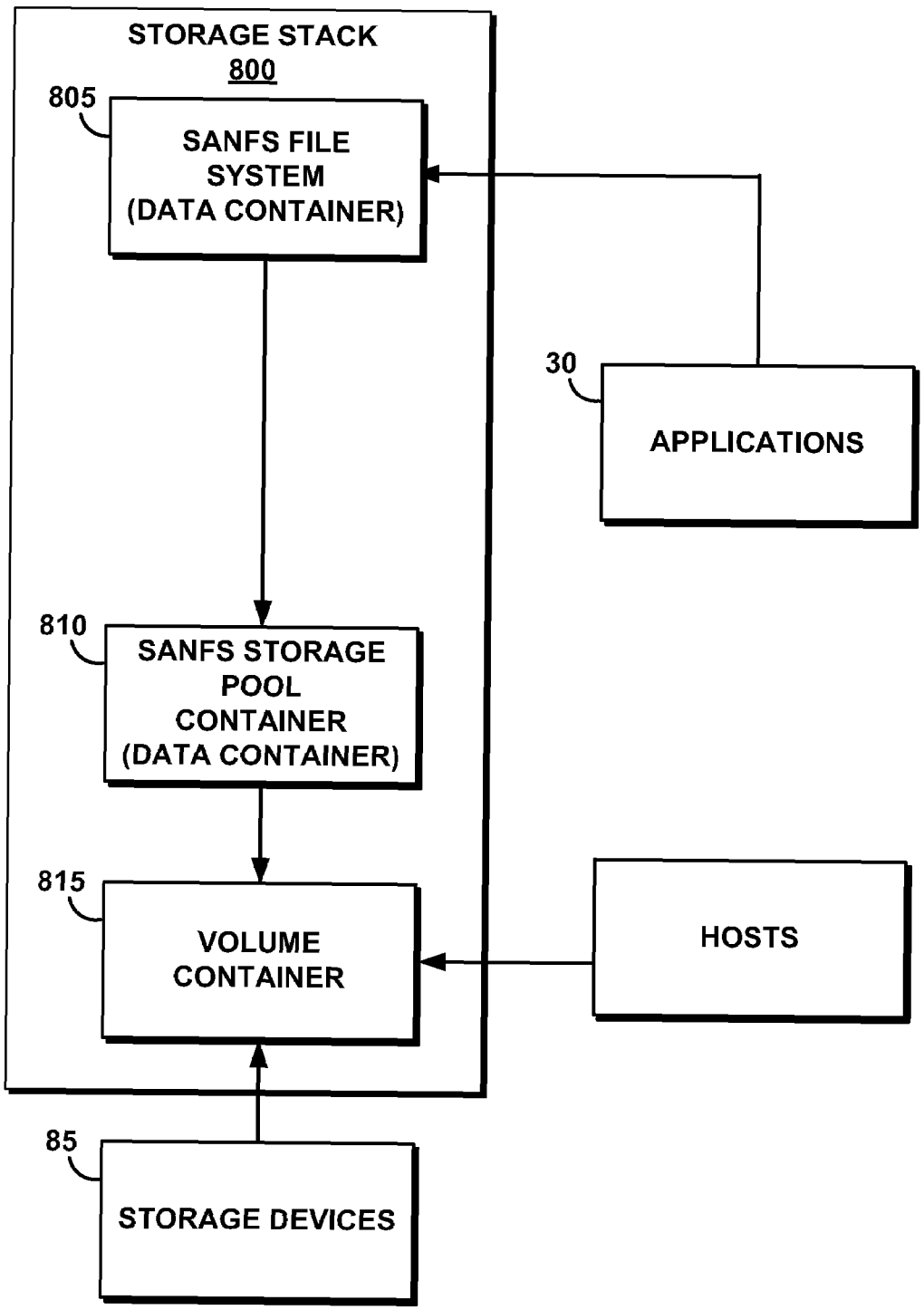
FIG. 8 is a diagram illustrating an exemplary model generated by the storage provisioning system of FIGS. 1 and 2 for a storage area network file system, such as SAN.FS.

FIG. 8 illustrates an exemplary model generated by system 10 for a storage area network file system (SAN.FS). For SAN.FS, the file system is represented as a top-level data container, a SANFS file system container 805. The SANFS file system container 805 comprises a group of SAN.FS storage pool data containers, represented as a SANFS storage pool container 810. Each SANFS storage pool container 810 obtains storage from a volume container 815 that represents the group of storage devices 85 that comprise the storage pool.

System 10 defines and registers services at any level that maps to a data container entity. Consider for example, a service such as cloning that requires invoking at every level below the object level of the data container 230 where cloning is invoked. System 10 defines this service at each such level; furthermore, this service is compatible with the service defined at the top-level data container level where the service is invoked. In one embodiment, the storage management framework 220 provides support for the service. In another embodiment, the user provides support for a specialized service.

When the storage management framework 220 provides support for a service, pre-packaged services are verified to be compatible with each other and to provide the right functionality within layers of data containers 230. Any pre-packaged service is tested for all the layers from the top-level data container 230 to the physical storage level at the storage devices 85.

When the user provides support for a specialized service, the user is allowed to specify some special service for a particular layer. In that case, the user is responsible for maintaining that service and ensuring that the service provides the expected functionality without affecting any other pre-packaged services. The storage management infrastructure of system 10 is not responsible for any incorrect configurations caused due to the user-defined services.

Each data container service comprises the following attributes: service type, service provider, and parameter list. Service type is a value that indicates a type of service. Types of service comprise mandatory, optional, and user defined. Mandatory service is a type of service that requires support by any data container. Optional data service is not mandatory, and may be present often in several data containers. User-defined data services a specialized type of service that is provided only to certain specific data containers, and is not generically available in other data containers.

Each service has an associated service provider that can perform the registered service on the data container. The parameter list is a list of parameters required to be passed to a data container as input for an associated service to be performed on the data container. Parameters may otherwise be mapped to a data container policy.

The storage management framework 220 provides basic support for the mandatory services associated with each container. Additional service details specific to the data container 230 or implementation of more complex services is left to the storage vendors for the data containers 230. The data container services can in turn invoke the volume container functions for storage operations.

Exemplary services or functions supported by data containers 230 comprise a create function, a delete function, an extend function, a copy function, a clone function, a "get data container names" function, a "get attributes" function, a "set attributes" function, a "get volumes" function, a reduce function, a quiesce function, and a resume function.

System 10 invokes the create function to create a new data container 230. The new data container 230 may be any data container type supported by the management infrastructure of system 10 (e.g., database, file system, or logical volume). The new data container 230 may be a data container 230 that is related to another existing storage container. For example, a database data container may be created and related to an existing file system container. When an upper-level data container 230 is created, a parameter of the "Create Data Container" request is the names of the lower-level data containers 230 or volume containers 235 that are to be related to the new data container 230. The "Create Data Container" request creates the upper-level data container 230 and forms the relationship between the new upper-level data container 230 and the existing lower-level data containers 230. If the parameter is not specified, then a new volume container 235 is created and linked with the newly created data container 230. A policy may be specified to determine how to create the new volume container 235. Input to the create function comprises a data container name, a data/volume container name, and a policy ID. Output of the create function comprises a success/failure status.

System 10 invokes the delete function to delete an existing data container 230. The delete function deletes data container connections with the lower-level data containers 230 and volume containers 235. System 10 further deletes any data containers 230 dependent on the data container 230 being deleted. For example, if a database container that points to a file system container is deleted, the file system container is also deleted. However, the associated volume containers 235 need not be deleted, only the association from the volume container 235 to the deleted data container 230 is deleted. Input to the delete function comprises a data container name. Output of the delete function comprises a success/failure status.

System 10 invokes the extend function to add storage to a storage provider that is underneath a data container 230. If the storage provider is a volume container 235 at the bottom of the storage stack, the list of volumes used to extend the volume container 235 may be passed as a parameter. If not specified, a policy may be given to determine which volumes are to be added to the volume container 235. Input to the extend function comprises a data container name, and a list of volume IDs or a policy ID. Output of the extend function comprises a success/failure status.

System 10 invokes the copy function to copy a data container 230. The copy function creates a point-in-time copy of volumes in the bottom-most volume container 235 that is providing storage to a specified data container 230. Input to the copy function comprises a data container name. Output of the copy function comprises a list of new copied volume IDs.

System 10 invokes the clone function to clone a data container 230. The clone function creates a point-in-time copy of volumes in the volume container 235 underneath a specified data container 230. In the case where an upper-level data container 230 in a recursive data container relationship is cloned, all lower-level containers in the relationship are cloned. For example, a request to clone a database data container that is related to a file system container (i.e., database is stored in files of a file system) results in a clone of both the upper-level database data container and the lower-level file system container. Input to the clone function comprises a data container name. Output of the clone function comprises a new copied data container name.

System 10 invokes the "get data container names" function to get the names of all the data containers 230. If a data container identifier is passed as a parameter, then the "get data container names" function returns the name of that specific data container 230. Input to the "get data container names" function comprises a data container name. Output of the "get data container names" function comprises a data container names list.

System 10 invokes the "get attributes" function to get the attributes of a data container 230. If a list of attribute names is passed as a parameter, then the "get attributes" function returns the values of those attributes. If not, the "get attributes" function returns the values of all the data container attributes. Input to the "get attributes" function comprises a data container name and an attribute name list. Output of the "get attributes" function comprises an attribute value list.

System 10 invokes the "set attributes" function to set the attributes of a data container 230. Input to the "set attributes" function comprises a data container name, an attribute name list, and an attribute value list. Output of the "set attributes" function comprises a success/failure status.

System 10 invokes the "get volumes" function to get a list of volumes associated with the bottom-most volume container 235 pointed to by a data container 230. Input to the "get volumes" function comprises a data container name. Output of the "get volumes" function comprises a volume ID list.

System 10 invokes the reduce function to remove storage from the storage provider underneath a data container 230. System 10 invokes the quiesce function to quiesce a data container 230 prior to a cloning operation. System 10 invokes the resume function to resume the data container 230 when a cloning operation is completed.

Each data container object comprises associated services or operations. Each sub-class of the data container object (e.g., file system container, database container, etc) provides an implementation of these associated services defined for each data container object.

To execute any service, system 10 recursively processes the storage stack starting from the top-level data container 230. Each data container 230 in the storage stack calls a method corresponding to the service being executed. If required, a specific data container 230 uses the "getsStorageFrom" relation to determine which data containers 230 provide storage to the specific data container 230. The specific data container 230 then calls the service being executed on the data containers 230 providing storage to the selected data container 230.

Figure 9:
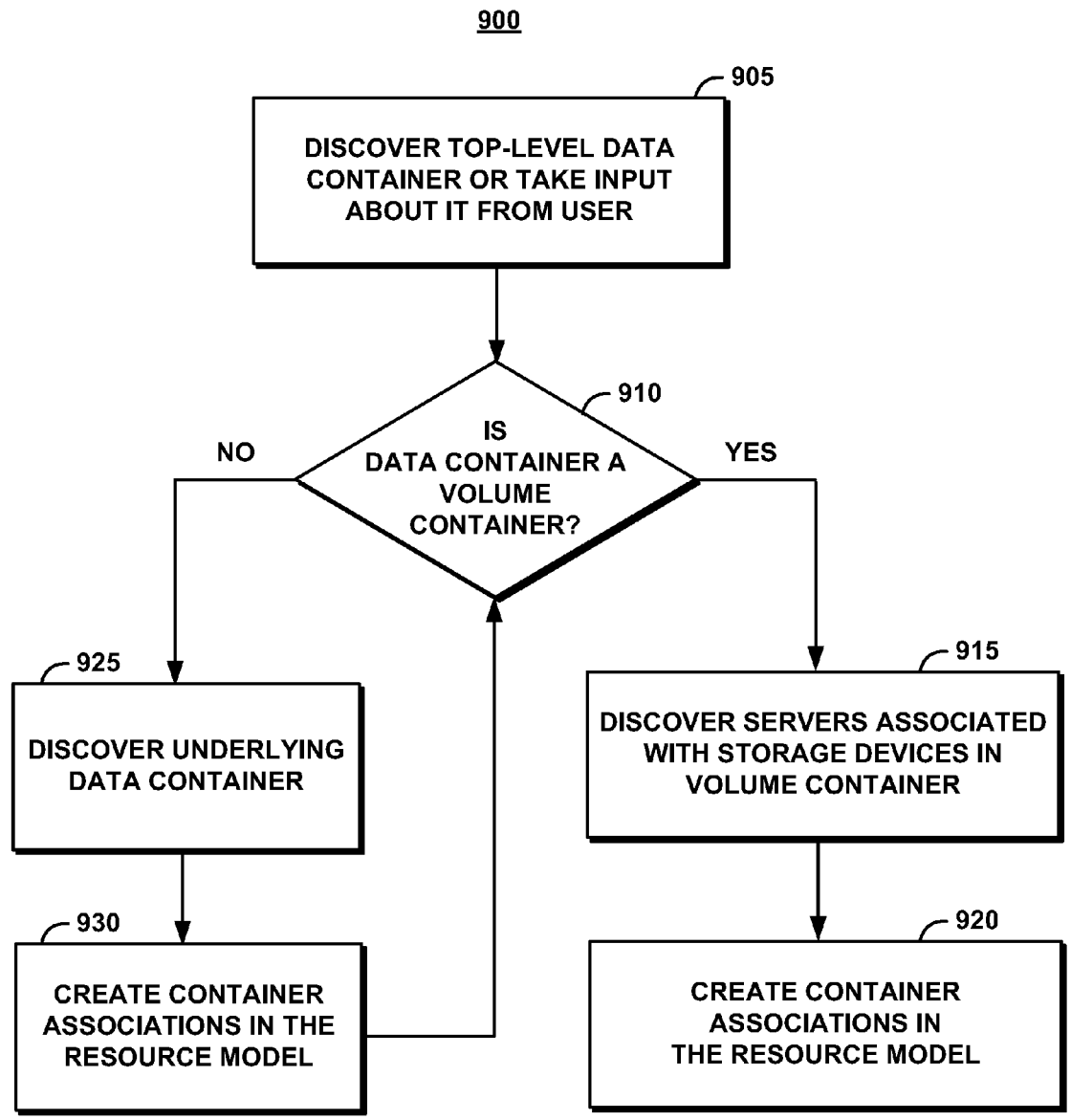
FIG. 9 is a process flow chart illustrating an exemplary method of operation of the storage provisioning system of FIGS. 1 and 2 in generating a storage stack comprising data containers and a volume container.

FIG. 9 illustrates a method 900 of system 10 in creating a storage stack comprising one or more data containers 230 and a volume container 235. (step 905). The discovery process starts from the top-level data container or application. This input may be provided by the user. For each data container, the discovery process determines, at step 910, if the data containers that provide storage is a volume container. Upon finding such a data container, it updates the resource model with the container associations. If the newly discovered data container is a volume container, method 900 proceeds to step 915 and discovers the servers associated with the storage devices in the volume container. Method 900 then proceeds to step 920 and creates container associations in the resource model.

If, however, it is determined at step 910 that the newly discovered data container is not a volume container, the discovery process 900 updates the resource model and recursively continues the process of determining the underlying data containers (step 925) and creating containers associations in the resource model, until it reaches the bottom-most volume container.

Figure 10:
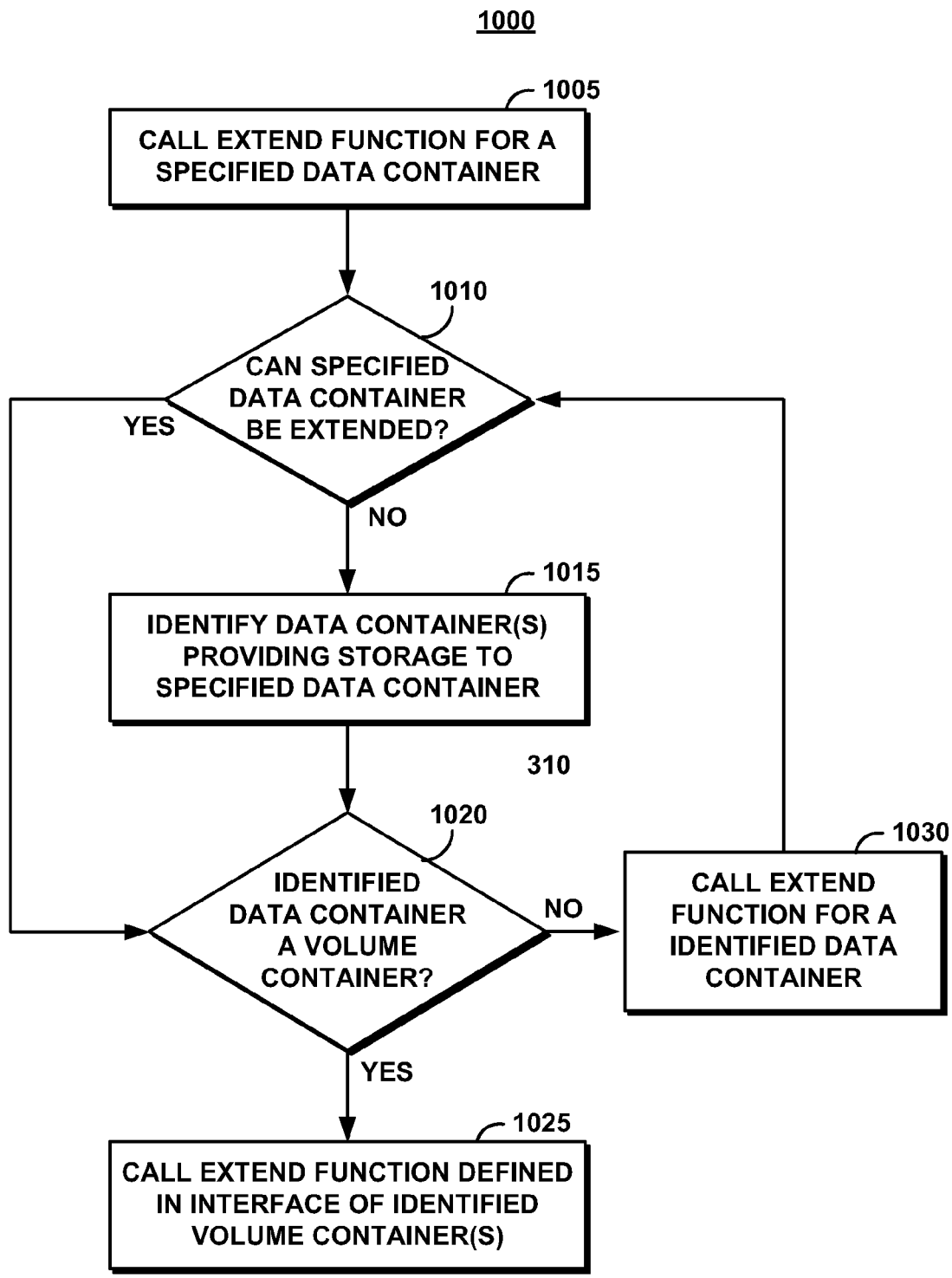
FIG. 10 is a process flow chart illustrating an exemplary method of operation of the storage provisioning system of FIGS. 1 and 2 in adding storage to a data container.

FIG. 10 illustrates an exemplary method 1000 of system 10 in adding storage to a volume container 235. For example, a top-level data container 230 (a file system container) represents a file system and the system administrator wishes to extend the file system. The file system object class comprises an "extend" function defined in the interface of the file system object class. System 10 calls the extend function when the extend service is to be executed on a specified data container 230, i.e., the file system container (step 1005). The extend function determines whether the extend function can perform the extend service on the specified data container 230 (decision step 1010). If not, the system 10 identifies one or more data containers 230 that provide storage to the specified data container 230 (step 1015).

System 10 determines whether the identified data container 230 is a volume container 235 (decision step 1020). If yes, system 10 calls the extend function defined in the interface for the identified data container 230 that is a storage source (step 1025). If at decision step 1020 the specified data container 230 can be extended, system 10 performs step 1025. If at decision step 1020 the identified data container 230 is not a volume container 235, system 10 calls an extend function for the identified data container 230 and recursively repeats steps 1010 through 1030 until a data container 230 is identified that can be extended or until an identified data container 230 is a volume container 235. In this manner, the storage stack of data containers 230 is traversed until system 10 reaches a volume container object that points only to storage devices 85. At that point system 10 calls the extend function for the storage devices 85 and appropriate action is taken for extending the file system.

Exemplary sample code for a data container object class with the extend function is as follows:

```
Class FileSystem extends DataContainer
{
    public int extend( )
    {
        /* Check if the file system can be extended
         * without having to traverse the object stack
         */
        ......... Check FS extension .........
        /* If not possible, traverse the object stack */
        DataContainer dc = this.getsStorageFrom( );
        dc.extend ( );
        /* Additional steps to complete file
         * system extension
         */
        ......... Extend FS .........
    }
}
```

System 10 may use policy to specify different aspects of system 10 at different levels of a storage stack. At a data container level, policy is used to define user-level specifications for the application that maps to the data container 230. Policies are also specified at the lower volume container level. Inter-layer policies are validated to avoid any conflicts. Otherwise, a clear priority is specified between data containers 230 to pre-empt any conflicting policies. System 10 further maps the high-level policy at the data container level to the volume container level. The user specifies system requirements to be translated into system capabilities at the lower physical levels. User expectations are converted into volume container storage service class attributes; e.g. availability at the user level may translate to certain special backup/restore requirements at the physical storage level.

The exact details of the data container policy depend on the specific type of data container 230. Exemplary policy attributes comprise performance in transactions per second, availability, allocation, replication, and security. Availability comprises no single point of failure, number of nines, and number of local data copies. Allocation comprises automatic extension, maximum extension amount, extension trigger, extension time, and maximum extension amount. Replication comprises target quality, schedule, frequency, replication mechanism, location, Recovery Time Objective (RTO), and Recovery point Objective (RPO). Security comprises exclusive storage pool access, wire encryption, data encryption, and write once read many (WORM) media.

The user may wish to specify the system requirements at a higher application level rather than at the data container level. For example, the user may specify a certain type of workload like Online Analytical Processing (OLAP), Online Transaction Processing (OLTP), fixed percentages of reads and writes, etc. In one embodiment, system 10 comprises a template-based approach with pre-defined packages as given in the examples previously described. These pre-defined packages are suitably defined by some specific combination of attributes of the policy definitions at the data container level. Further, system 10 comprises a provision to specify the values of certain parameters to tailor the packages for the user requirements.

It is to be understood that the specific embodiments of the invention that have been described are merely illustrative of certain applications of the principle of the present invention. Numerous modifications may be made to the system and method for providing automated storage provisioning described herein without departing from the spirit and scope of the present invention.

What is claimed is:

1. A processor-implemented method of providing automated storage provisioning, comprising:

generating a storage management framework including a resource model representing a set of storage devices for use by an application;

wherein the resource model comprises:

a set of data containers and volume containers, said volume container representing a specialized data container representing a many-to-many relationship between a set of storage devices and a set of host devices that run said application that access said storage devices, wherein each said storage device belongs to only one volume container, and each of said host devices are a part of at least one volume container;

said data containers comprising at least one common attribute selected from the group consisting of: a unique identifier, one or more services, a policy, and one or more data containers, wherein the data containers obtain storage from another of said data containers or one of said volume containers and wherein the data containers comprise a file system container that represents a file system, a database container that represents a database, a tablespace container that represents a tablespace, a logical volume container that represents a logical volume, and a volume group data container that represents a volume group;

and database containers contain the following attributes: name, owner, block size, log mode, status, read-write, read-only, maximum instances, number of tablespaces, maximum data files, number of data files, maximum log files, number of log files, total size, free space, create time, delete time, log size, log free space, type, and server;

defining high level policies representing a management policy regarding user-level specifications associated with said application, said high level policies being mapped at the data container virtual level and the volume container level such that each of said policies is associated with at least one of said containers, said policies dictating associations of said data containers and associated ones of said volume container with regard to types of containers and types of volumes in the volume containers and quality of storage in the data containers, and zoning of said applications and said storage devices, wherein inter-virtual level policies are validated to avoid conflicts, and wherein polices for a specified data container are applied to virtual levels of data containers below said specified data container, and the policies at all virtual levels below each of said data containers are nonconflicting or with well-defined priorities between the data containers to pre-empt conflicting policies, and each data container has a single policy, and policy attributes comprise performance in transactions per second, availability, allocation, replication, and security, and availability comprises no single point of failure, and number of local data copies, and allocation comprises automatic extension, maximum extension amount, extension trigger and extension time, and replication comprises target quality, schedule, frequency, replication mechanism, location, recovery time objective, recovery point objective, and security comprises exclusive storage pool access, wire encryption, data encryption, and write once read many media;

converting user expectations into volume container storage service class attributes;

representing said storage as a stack from said application to a lowest virtual level storage subsystem in said storage devices wherein said policies further map application requirements at a top of the storage stack to resources at a lowest virtual level of the storage stack;

providing storage to the application independent of interfaces used by the set of storage devices, wherein the volume container interfaces directly with the storage devices utilizing services for a specific resource in the storage devices providing the specific physical or logical storage resource and is located at a bottom of said storage stack, each of said storage devices belonging to only one of said volume containers;

executing storage services by recursively processing the storage stack starting from a top-level data container;

verifying pre-packaged storage services compatibility with each other by the storage management framework when the storage management framework provides support for services and verifying pre-packaged storage services compatibility with each other by the user when the user provides support for services;

testing pre-packaged services in all virtual levels;

cloning an upper virtual level data container that is in a recursive data relationship such that cloning the upper virtual level data container in a recursive data relationship results in all lower virtual level data containers being cloned; and simplifying storage management by hiding device details of the storage devices.

2. The method of claim 1, wherein the resource model comprises a rules module for governing the construction of the data containers and the volume containers and associations between the data containers and the volume containers.

3. The method of claim 1, wherein the storage management framework comprises a data container services module that includes a set of standard services that are performable on the data containers, and each of said services are registered to at least one of said data containers.

4. The method of claim 1, wherein the storage management framework comprises a volume container services module that includes a set of standard services that are performable on the volume containers.

5. The method of claim 4, wherein the storage management framework comprises a management agent that monitors physical resources and that invokes the standard services based on a state of entities relative to policies associated with the entities.

6. The method of claim 5, wherein the entities include any one or more of:
- a data path;
- a storage pool;
- a storage pool collection;
- a port, wherein said port is one of: a port on a switch on a host, or a port in the storage devices;
- a host bus adapter for a server in the application;
- a switch, wherein said switch is a fiber-channel switch; and
- a node, wherein said node represents the fiber channel nodes provided by the storage devices.

7. A computer program product having program codes stored on a computer-readable medium for use in connection with a computer for providing automated storage provisioning comprising:
- a program code for generating a storage management framework including a resource model representing a set of storage devices for use by an application;
- wherein the resource model comprises a set of data containers and volume containers, the resource model modeling said storage as a stack from said application to a lowest virtual level storage subsystem in said storage devices, and including high level policies defining a management policy regarding user-level specifications associated with said application mapped at each of a virtual level associated with a data container and a volume container, said policies dictating management of an associated one of said data container and said volume container, wherein inter-virtual level policies are validated to avoid conflicts; and wherein said inter-virtual level polices for a specified data container are applied to virtual levels of data containers below said specified data container, and the inter-virtual level policies at all virtual levels below each of said data containers are one of: nonconflicting or with well-defined priorities for pre-emption, and each data container has a single policy;
- wherein the data containers obtain storage from another of said data containers or one of said volume containers and wherein the data containers comprise a file system container that represents a file system, a database container that represents a database, a tablespace container that represents a tablespace, a logical volume container that represents a logical volume, and a volume group data container that represents a volume group;
- wherein the resource model provides storage to the application independent of interfaces used by the set of storage devices;
- wherein the volume container is a specialized data container that interfaces directly with the storage devices and that is located at a bottom of said storage stack, each of said storage devices belonging to only one of said volume containers;
- a program code for executing storage services by recursively processing the storage stack starting from a top-level data container;
- a program code for verifying pre-packaged storage services compatibility with each other by the storage management framework when the storage management framework provides support for services and verifying pre-packaged storage services compatibility with each other by the user when the user provides support for services;
- a program code for testing pre-packaged services in all virtual levels; and
- a program code for cloning an upper virtual level data container that is in a recursive data relationship such that cloning the upper virtual level data container in a recursive data relationship results in all lower virtual level data containers being cloned.

8. The computer program product of claim 7, wherein the resource model comprises a program code for governing the construction of the data containers and the volume containers and an association between the data containers and the volume containers.

9. The computer program product of claim 7, wherein the storage management framework comprises a program code including a set of standard services that are performable on the data containers, and each of said services are registered to at least one of said data containers.

10. The computer program product of claim 7, wherein the storage management framework comprises a program code including a set of standard services that are performable on the volume containers.

11. The computer program product of claim 10, wherein the storage management framework comprises a program code for monitoring physical resources and for invoking the standard services based on a state of entities relative to policies associated with the entities.

12. The computer program product of claim 11, wherein the entities include any one or more of:
- a data path;
- a storage pool;
- a storage pool collection;
- a port, wherein said port is one of: a port on a switch on a host, or a port in the storage devices;
- a host bus adapter for a server in the application;
- a switch, wherein said switch is a fiber-channel switch; and
- a node, wherein said node represents the fiber channel nodes provided by the storage devices.

13. A processor-implemented system of providing automated storage provisioning, comprising:
- a storage management framework including a resource model representing a set of storage devices for use by an application;
  - wherein the resource model comprises a set of data containers and volume containers, wherein high level policies defining a management policy regarding user-level specifications associated with said application are mapped at a data container virtual level and further mapped to a volume container virtual level, and types of volumes in the volume containers and quality of storage in the data containers, said policies dictate management of an associated one of said data container and said volume container, wherein inter-virtual level policies are validated to avoid any conflicts; and wherein polices for a specified data container are applied to virtual levels of data containers below said specified data container, and the policies at all virtual levels below each of said data containers are one of: nonconflicting or with well-defined priorities for pre-emption, and each data container has a single policy;
  - wherein the data containers obtain storage from another of said data containers or one of said volume containers and wherein the data containers comprise a file system container that represents a file system, a database container that represents a database, a tablespace container that represents a tablespace, a logical volume container that represents a logical volume, and a volume group data container that represents a volume group;

said database containers containing the following attributes: name, owner, block size, log mode, status, read-write, read-only, maximum instances, number of tablespaces, maximum data files, number of data files, maximum log files, number of log files, total size, free space, create time, delete time, log size, log free space, type, and server;

wherein the resource model provides storage to the application independent of interfaces used by the set of storage devices, the resource model modeling said storage as a stack from said application to a lowest virtual level storage subsystem in said storage devices;

wherein the volume container is a specialized data container that interfaces directly with the storage devices and that is located at a bottom of said storage stack, wherein each said storage device belongs to only one volume container, and each of said host devices are a part of at least one volume container; and simplifying storage management by hiding the device details of the storage devices;

executing storage services by recursively processing the storage stack starting from a top-level data container;

verifying pre-packaged storage services compatibility with each other by the storage management framework when the storage management framework provides support for services and verifying pre-packaged storage services compatibility with each other by the user when the user provides support for services; and cloning an upper virtual level data container that is in a recursive data relationship such that cloning the upper virtual level data container in a recursive data relationship results in all lower virtual level data containers being cloned.

14. The system of claim 13, wherein the resource model comprises a rules module for governing the construction of the data containers and the volume containers and associations between the data containers and the volume containers.

15. The system of claim 13, wherein the storage management framework comprises a data container services module that includes a set of standard services that are performable on the data containers, and each of said services are registered to at least one of said data containers.

16. The system of claim 13, wherein the storage management framework comprises a volume container services module that includes a set of standard services that are performable on the volume containers.

17. The system of claim 16, wherein the storage management framework comprises a management agent that monitors physical resources and that invokes the standard services based on a state of entities relative to policies associated with the entities.

18. The system of claim 17, wherein the entities include any one or more of:
   a data path;
   a storage pool;
   a storage pool collection;
   a host bus adapter for a server in the application;
   a switch, wherein said switch is a fiber-channel switch; and
   a node, wherein said node represents the fiber channel nodes provided by the storage devices.

* * * * *